United States Patent [19]

Otto et al.

[11] Patent Number: 4,829,399

[45] Date of Patent: May 9, 1989

[54] FILLED LAYER COMPONENT MADE OUT OF A MONOLITHIC CERAMIC BODY

[75] Inventors: Klaus Otto, Nuremberg; Thomas Moser, Schnaittach; Horst Kippenberg, Herzogenaurach; Erich Röss, Unterhaching, all of Fed. Rep. of Germany

[73] Assignee: Siemens Aktiengesellschaft, Berlin and Munich, Fed. Rep. of Germany

[21] Appl. No.: 86,563

[22] Filed: Aug. 18, 1987

[30] Foreign Application Priority Data

Aug. 18, 1986 [DE] Fed. Rep. of Germany ....... 3627929

[51] Int. Cl.4 .......................... H01G 4/10; H01G 7/00
[52] U.S. Cl. ..................................... 361/321; 29/25.42
[58] Field of Search ............... 29/25.42; 361/303–305, 361/308–310, 320, 321; 228/121 M

[56] References Cited

U.S. PATENT DOCUMENTS

| | | | |
|---|---|---|---|
| 3,679,950 | 4/1971 | Rutt | 317/258 |
| 3,772,748 | 1/1972 | Rutt | 29/25.42 |
| 3,784,887 | 1/1974 | Sheard | 361/321 X |
| 3,829,356 | 8/1974 | Rutt | 161/161 |
| 3,883,946 | 5/1975 | Dale | 228/121 M |
| 3,965,552 | 6/1976 | Rutt | 29/25.42 |
| 4,030,004 | 3/1975 | Rutt | 361/313 |
| 4,071,880 | 1/1978 | Rutt | 361/309 |
| 4,168,519 | 9/1979 | Hertz | 361/305 X |
| 4,482,933 | 11/1984 | Alexander | 361/321 |
| 4,584,629 | 4/1986 | Garcia et al. | 361/321 |

FOREIGN PATENT DOCUMENTS 2323921 2/1974 Fed. Rep. of Germany .
2193795 2/1974 France .

Primary Examiner—Donald A. Griffin
Attorney, Agent, or Firm—Kenyon & Kenyon

[57] ABSTRACT

The invention relates to a filler layer component for a monolithic ceramic body having a ceramic layer structure of dense and porous layers which is impregnated with a metallic material. According to the invention, one selects as impregnating material a metal or alloy which in its liquid state wets the ceramic. This may be in particular a lead-indium, a copper-indium, or a silver-indium alloy in which the indium content is greater than 0.5%.

16 Claims, 1 Drawing Sheet

FILLED LAYER COMPONENT MADE OUT OF A MONOLITHIC CERAMIC BODY

FIELD OF THE INVENTION

The invention relates to a filled layer component made out of a monolithic ceramic body with a ceramic layer structure of dense and porous layers, which is impregnated with a metallic material.

BACKGROUND OF THE INVENTION

In the pressure impregnation of porous ceramic parts with metal one uses for example lead or lead alloys. These materials are known to have no wetting action on ceramic surfaces. After the pressure impregnation, therefore, the liquid metal can run out of the components again when the ceramic parts are extracted from the impregnating bath. To prevent this, normally the outer surfaces of the ceramic part are coated with fine-pored coatings, e.g. by sintering on glass frits, which after pressure impregnation must be removed mechanically, or by the firing on of silver pastes.

In U.S. Pat. Nos. 3,965,552 and 4,071,880 a filler layer component of the above mentioned kind and a method for the production thereof are known, wherein the layer structure of alternately dense and porous layers is impregnated, in particular with the metals lead (Pb), aluminum (Al), copper (Cu), zinc (Zn), tin (Sn) and cadmium (Cd) or alloys of one or more of these metals. The assumption here is that specifically those metals must be selected which do not wet the ceramic bodies into which they are being injected. In particular, undesirable surface depositions of the metals or of the alloys are to be prevented or minimized as they would otherwise have to be removed separately in order to prevent short ciruits. Specifically there is proposed in the above identified U.S. Patent that the bismuth alloy Bi63Pb25Sn-10In2, the zinc alloy ZnAl4Cu1 or the silver alloy Ag-Cu28 as well as various brasses and bronzes, which are said to fulfill the stipulated limit conditions.

It is therefore an object of the present invention to develop filler layer components with their respective impregnating materials for which no additional measures are necessary to prevent the melt from running out of the ceramic part when it is being extracted from the impregnating bath.

SUMMARY OF THE INVENTION

In accordance with this objective, there is provided an impregnating material which is a metal or alloy that in its liquid state wets the ceramic. Preferably the impregnating material may be a lead-indium alloy. Any residues of the impregnating material that may adhere to the outer surfaces of the ceramic parts can be removed in a simple manner by a chemical treatment with an etching solution.

The basis for the invention were studies concerning the wetting behavior of impregnating alloys on ceramic. In contrast to the state of the art it was found that by additions of indium (In), particularly, above a minimum level, to the possible impregnating alloys, wetting of the ceramic by the impregnating metal melts is achieved.

For such alloys, therefore, the measures previously necessary to prevent the the liquid metal melt from running out may be omitted.

Other advantages of the invention will be evident from the following description of several embodiments of the invention with reference to the drawings.

BRIEF DESCRIPTION OF THE DRAWINGS

In the figures, identical parts are given the same reference symbols. The figures are described below jointly in part.

DETAILED DESCRIPTION OF THE INVENTION

Figure 1:
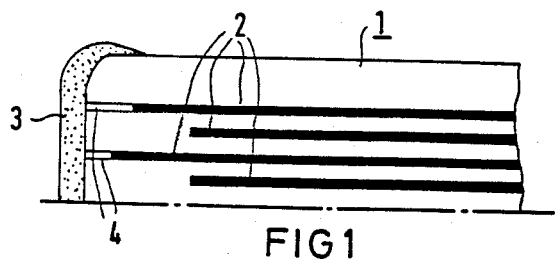
FIG. 1 is a sectional view of a prior art filler layer component which is impregnated with a non-wetting material.
Figure 2:
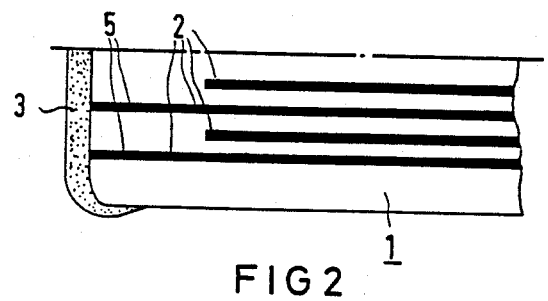
FIG. 2 is a sectional view of a filler layer component in accordance with the present invention.

In FIG. 1 and FIG. 2 a cutout from a component 1 is illustrated which shows a layer structure of alternately dense and porous layers.

If the porous layers 2 are filled with metallic materials and if the side surfaces of component 1 are provided with metallic layers as electrical contacts 3, capacitors can be realized due to the dielectric properties of the ceramic. To this end, the porous layers 2 must be filled with an impregnating metal in a suitable manner. This is done in known manner by pressure or centrifugal impregnation, using for example lead-based materials.

Referring to FIG. 1, a lead-impregnated component 1 is shown on which the contacts 3 are subsequently applied. Due to the non-wettability of the ceramic by lead the lead runs out of the ceramic, at least in part, when extracting the component 1 from the liquid impregnation bath. As a result, edge regions 4 of layers 2 remain incompletely filled and the subsequent electric bond to the contacts 3 is made impossible.

To prevent the liquid impregnating material from running out, the practice has been to coat the outer surfaces of the ceramic component 1 with fine-pored coatings, e.g. by the sintering on of glass frits, which after pressure impregnation had to be removed mechanically. Another procedure uses as a preliminary step, the firing on of a composition containing silver to form silver contacts the result of which pressure impregnation is possible. In any case, however, an additional expense was necessary.

In FIG. 2 there is shown the same ceramic component 1 as in FIG. 1, filled with an alloy which wets the ceramic in the liquid state. It is seen that the porous layers 2 are completely filled and that the subsequently applied contacts 3 are electrically connected with these layers.

A suitable addition to the main constituent of the impregnating material, e.g., lead, which assures wettability, is indium. In contrast to the state of the art, as described in U.S. Pat. Nos. 3,965,552 and 4,071,880, it was found that the addition of indium to lead significantly improves the wetting of ceramic, as shown in the graph of FIG. 3.

Figure 3:
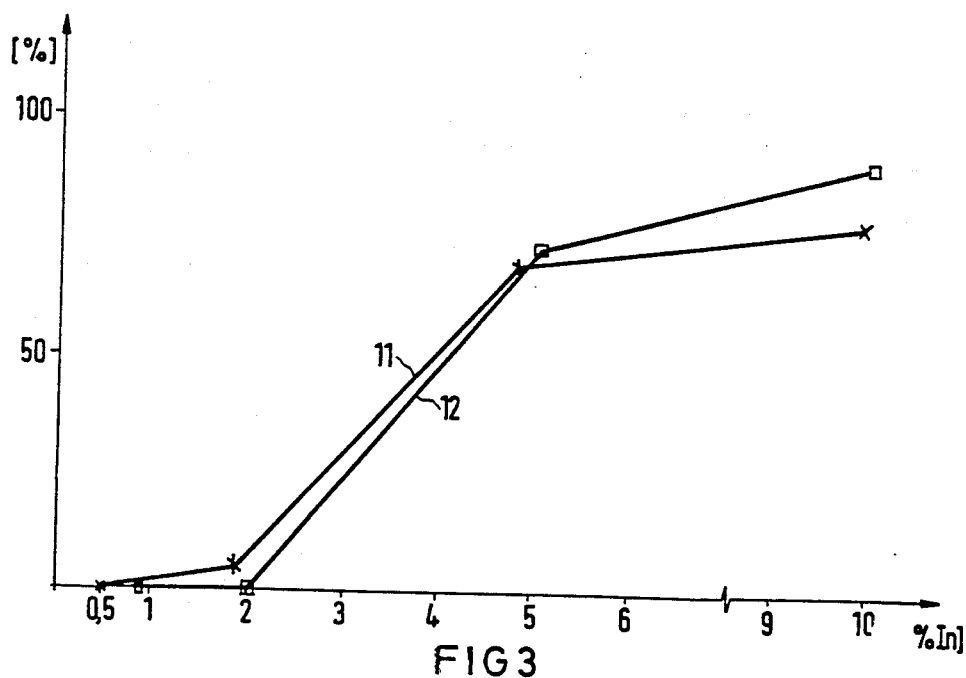
FIG. 3 is a graph illustrating the relation between the indium content in the impregnating metals and properties of the product of the invention.

FIG. 3 illustrates the electrical bond as a function of the indium content in a lead alloy. On the abscissa is indicated the content by mass of a lead-indium alloy in percent and on the ordinate, the usability of the manufactured components. The results of two test series 11 and 12 are shown.

The electrical bond between the metal filler 5 and contacts 3 as a result of the manufacturing process is ultimately a measure of the usability of the impregnating material. It can be seen that below 0.5% indium by weight the material is unsuitable in any event. Further, it can be seen that at indium contents of about 0.5% by weight a slight improvement is obtained, and only at indium contents from about 2% by weight are the usability values clearly increasing. On the whole it can be concluded that the indium content in a lead-indium alloy used as impregnating material should advantageously be above 2% by weight and more particularly between 2.5 and 20% by weight.

It has been found that for a lead-based impregnating material for wetting the ceramic, the indium can be replaced at least in part by gallium (Ga). The gallium content may be as much as about 20% by weight.

If desired, further additions may be made to the impregnating material to adjust to a suitable melting point, in particular to a value above 180° C., or to adjust the solidification properties. When making such additions, however, one must watch that the wetting properties will not become worse again at the same time. Possible further additions are, for example, tin up to a content of about 10% by weight, antimony up to a content about 45% by weight, or also bismuth up to a content about 35% by weight. The latter value is in any case clearly below the known values at which, in particular, for a bismuth-lead alloy, specifically a non-wetting behavior was aimed at.

The described lead-based alloys are well suited as impregnating materials for the production of capacitors. It has been found, however, that for certain other applications of the filler layer components, lead-indium alloys are not yet optimal due to the specific conductivity, the melting point, and a certain susceptibility to aging. For such purposes also copper-indium or silver-indium alloys can be used, which also show ceramic-wetting properties in the liquid state.

What is claimed is:

1. A filler layer suitable for making a component by impregnating a monolithic ceramic body of dense and porous layers and having electrical contacts at the outer surfaces, which comprises: an impregnating metal or alloy material capable of wetting the ceramic in the liquid state, whereby the impregnating material is completely retained within the ceramic body after impregnation without the necessity of having a pre-coating on the outer surface of the ceramic body prior to impregnation.

2. A filler layer according to claim 1, wherein the impregnating metal or alloy material is a lead-indium alloy having between about 2.5% to about 20% by weight indium.

3. A filler layer according to claim 1, wherein the impregnating metal or alloy material is a copper-indium alloy having between about 2.5% to about 20% by weight indium.

4. A filler layer according to claim 1, wherein the impregnating metal or alloy material is a silver-indium alloy having at least about 2% by weight indium.

5. A filler layer according to claim 4, wherein the indium content is between about 2.5 and about 20% by weight.

6. A filler layer according to claim 2, 3 or 4, wherein the indium portion of the impregnating material is replaced at least in part by gallium.

7. A filler layer as in claim 6, wherein additional elements are added to the impregnating material for adjusting the melting point to a temperature of at least 180° C. and for adjusting the solidification properties of the impregnating materials.

8. A filler layer as in claim 5 wherein the indium portion of the impregnating material is replaced at least in part by gallium.

9. A filler layer according to claim 2, 3 or 4, wherein additional elements are added to the impregnating material for adjusting the melting point to a temperature of at least 180° C. and for adjusting the solidification properties of the impregnating material.

10. A filler layer according to claim 9, wherein the impregnating material contains additionally tin (Sn).

11. A filler layer according to claim 9, wherein the impregnating material contains additionally antimony (Sb).

12. A filler layer according to claim 9, wherein the impregnating material contains additionally bismuth (Bi).

13. A component comprising a monolithic ceramic layer body of dense and porous layers with electrical contacts at its outer surfaces and a filler layer of a metal or alloy material impregnated therein that is capable of wetting the ceramic when the component is in the liquid state, whereby the filler layer does not run out of the ceramic body after it is impregnated therein without the necessity of having a pre-coating on the outer surface of the ceramic body prior to impregnation.

14. A component according to claim 13 wherein the metal or alloy material is a lead alloy or lead metal mixture with another metal selected from the group consisting of indium, gallium, tin and mixtures thereof.

15. A component according to claim 13 wherein the metal or alloy material is a silver alloy or silver metal mixture with another metal selected from the group consisting of indium, gallium, tin and mixtures thereof.

16. A component according to claim 13 wherein the metal or alloy material is a copper alloy or copper metal mixture with another metal selected from the group consisting of indium, gallium, tin and mixtures thereof.

* * * * *